US009774731B1

(12) United States Patent
Haltom et al.

(10) Patent No.: US 9,774,731 B1
(45) Date of Patent: Sep. 26, 2017

(54) ADDING ADDITIONAL INFORMATION TO CALLER ID INFORMATION

(71) Applicant: Verizon Patent and Licensing Inc., Arlington, VA (US)

(72) Inventors: Jeffrey Haltom, Fishers, IN (US); Regina A. Chiurco, Broomes Island, MD (US); Heath W. Hendrickson, McKinney, TX (US); Lulia Ann Barakat, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/082,249

(22) Filed: Mar. 28, 2016

(51) Int. Cl.
| | |
|---|---|
| *H04M 3/42* | (2006.01) |
| *H04M 3/436* | (2006.01) |
| *H04Q 3/06* | (2006.01) |
| *H04M 1/725* | (2006.01) |
| *H04W 8/24* | (2009.01) |

(52) U.S. Cl.
CPC ..... *H04M 3/4365* (2013.01); *H04M 3/42034* (2013.01); *H04M 1/72519* (2013.01); *H04Q 3/06* (2013.01); *H04W 8/245* (2013.01)

(58) Field of Classification Search
CPC ............. H04W 8/245; H04M 1/72519; H04M 3/42042; H04Q 3/06
USPC .................. 455/415, 550.1, 418; 379/221.01
See application file for complete search history.

(56) References Cited

U.S. PATENT DOCUMENTS

| | | | | |
|---|---|---|---|---|
| 5,642,410 A * | 6/1997 | Walsh | ................... | H04M 1/663 379/128 |
| 7,203,301 B1 * | 4/2007 | Mudd | ................. | H04M 3/2281 379/126 |
| 7,813,490 B2 * | 10/2010 | DeMent | ............ | H04M 3/42017 379/221.03 |
| 8,442,209 B2 * | 5/2013 | Waalkes | .............. | H04M 3/2281 379/265.01 |
| 8,799,352 B2 * | 8/2014 | Cohen | ............... | H04M 3/42093 709/203 |
| 9,124,957 B1 * | 9/2015 | Fogel | ....................... | H04Q 3/66 |

(Continued)

OTHER PUBLICATIONS

Wikipedia, "Caller ID," https://en.wikipedia.org/wiki/Caller_ID, Mar. 14, 2016, 10 pages.

(Continued)

*Primary Examiner* — Danh Le

(57) ABSTRACT

A device may receive a first query from a terminating device. The first query may be based on the terminating device having received, from a calling party device, a request to establish a connection with a called party device. The first query may be based on information associated with the calling party device. The device may send, to a caller information device, a second query based on the first query. The device may receive, from the caller information device, caller information based on the second query. The device may compare the caller information to a criterion. The device may modify the caller information, to create modified caller information, when the caller information satisfies the criterion. The device may send the modified caller information to the terminating device for forwarding to another device to support determining how to handle, for the called party device, the request to establish the connection.

20 Claims, 4 Drawing Sheets

(56) References Cited

U.S. PATENT DOCUMENTS

| | | | | |
|---|---|---|---|---|
| 2003/0224764 | A1* | 12/2003 | Baker | G06Q 30/02 |
| | | | | 455/414.1 |
| 2004/0114571 | A1* | 6/2004 | Timmins | H04L 12/66 |
| | | | | 370/352 |
| 2005/0276386 | A1* | 12/2005 | Ethier | H04L 12/2602 |
| | | | | 379/32.05 |
| 2010/0158983 | A1* | 6/2010 | Davis | B01D 67/009 |
| | | | | 424/429 |
| 2013/0272513 | A1* | 10/2013 | Phadnis | H04M 3/42042 |
| | | | | 379/93.23 |

OTHER PUBLICATIONS

Lee, "Fullscreen Caller ID on the iPhone," http://www.itchban.com/blog/2015/1/23/fullscreen-caller-id-on-iphone, Jan. 27, 2015, 7 pages.

Wikipedia, "LIDB," https://en.wikipedia.org/wiki/LIDB, Sep. 26, 2012, 1 page.

Lunden, "Truecaller Extends Live Caller ID to Its iOS App to Fight Spam and Scam Calls," http://techcrunch.com/2014/04/22/truecaller-extends-live-caller-id-to-its-ios-app-to-fight-spam-and-scam-calls/, Apr. 22, 2014, 9 pages.

* cited by examiner

ADDING ADDITIONAL INFORMATION TO CALLER ID INFORMATION

BACKGROUND

A calling party device (e.g., a device associated with a calling party) may attempt to establish a connection with a called party device (e.g., a device associated with a called party). An identification service (e.g., a caller identification (ID) service) may allow caller information (e.g., identification information associated with the calling party device, such as a caller number or a caller name) to be received by the called party device. The caller information may be displayed by the called party device.

DETAILED DESCRIPTION OF PREFERRED EMBODIMENTS

The following detailed description of example implementations refers to the accompanying drawings. The same reference numbers in different drawings may identify the same or similar elements.

A user of a called party device may desire to make a decision about how to handle an incoming call (e.g., to answer, block, or ignore the call) before actually accepting the call. The user of the called party device, or a service acting on behalf of the user, may make a decision about how to handle an incoming call based on caller information (e.g., identification information associated with the calling party device, such as a caller number or a caller name) that is received by the called party device before accepting the call. However, the caller information (e.g., a caller number or a caller name) received before accepting a call may not provide a sufficient basis to make a decision about how to handle the call. Implementations described herein may add additional information (e.g., information beyond a caller number and/or a caller name) to the caller information. The additional information may enable a user of a called party device, or a service acting on behalf of the user, to make an informed decision about how to handle an incoming call (e.g., to accept, block, answer, or ignore the call).

Figure 1:
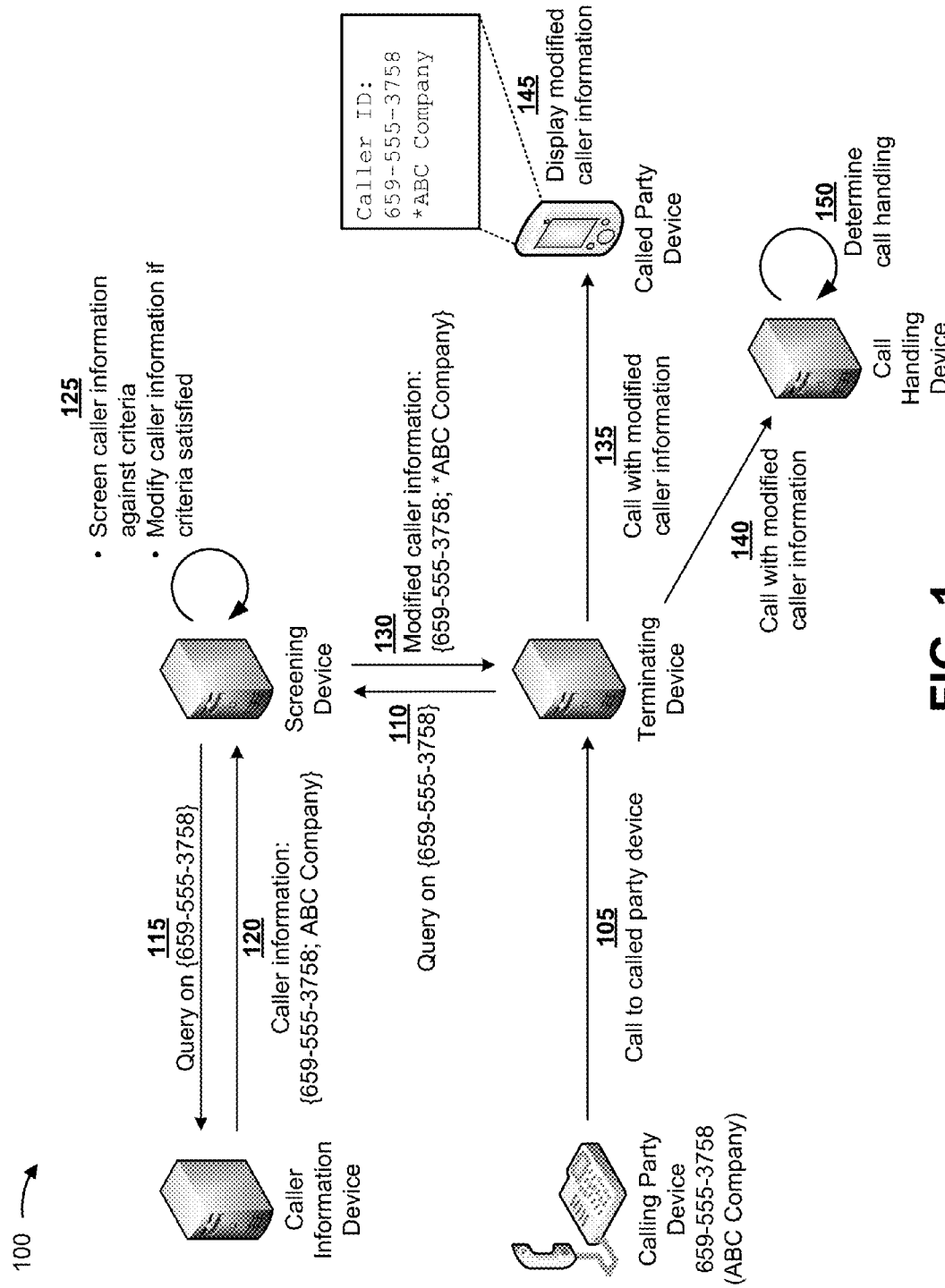
FIG. 1 is a diagram of an overview of an example implementation described herein.

FIG. 1 is a diagram of an overview of an example implementation 100 described herein. As shown in FIG. 1, assume that a calling party device, having a caller number (e.g., a telephone number) of 659-555-3758 and being associated with ABC Company, initiates a call (e.g., to establish a connection with) a called party device.

As shown by reference number 105, the calling party device may call the called party device (e.g., send a request to establish a connection with the called party device). The call may be routed through one or more telephone networks and/or one or more other types of networks to a terminating device. In some implementations, the call (e.g., the request to establish a connection) may include calling party device information (e.g., a caller number or other identification information associated with the calling party device).

The terminating device may obtain calling party device information (e.g., the caller number: 659-555-3758) for the calling party device based on the request to establish a connection. As shown by reference number 110, the terminating device may send a query, based on the calling party device information (e.g., the caller number: 659-555-3758), to a screening device. Based on the query received from the terminating device, the screening device may send, to a caller information device, a query based on the calling party device information (e.g., the caller number: 659-555-3758), as shown by reference number 115. Based on the query received from the screening device, the caller information device may send, to the screening device, caller information (e.g., the caller number and caller name: {659-555-3758; ABC COMPANY}) for the calling party device, as shown by reference number 120.

As shown by reference number 125, the screening device may screen the caller information against predetermined criteria (e.g., a time of day, a time range, a pattern, a ranking, a list of caller numbers and/or caller names, a presence of predetermined words, or the like). If the caller information satisfies the criteria, the screening device may modify the caller information based on the criteria. If the caller information does not satisfy the criteria, the screening device may send the caller information, without modification, to the terminating device for forwarding to the called party device and/or to a call handling device.

As further shown in FIG. 1, assume that the caller information (e.g., the caller number and caller name: {659-555-3758; ABC COMPANY}) satisfied the criteria, such that the screening device modified the caller information (e.g., by inserting an "*" at the start of the caller name field). Then, as shown by reference number 130, the screening device may send the modified caller information (e.g., {659-555-3758; *ABC Company}) to the terminating device.

When the terminating device receives the modified caller information from the screening device, the terminating device may route the call (e.g., the request to establish a connection with the called party device), with the modified caller information, to the called party device (as shown by reference number 135) and/or to the call handling device (as shown by reference number 140). As shown by reference number 145, the called party device may display the modified caller information (e.g., as part of a caller ID display). As shown by reference number 150, the call handling device may determine, based on the modified caller information, how the call should be handled for the called party device (e.g., whether the call should be blocked or sent to the called party device).

In this way, implementations described herein may modify caller information (e.g., caller ID information) to add additional information to the caller information that may enable a user of a called party device, or a service acting on behalf of the user, to make an informed decision about how to handle an incoming call (e.g., to answer, block, or ignore the call). Enabling informed decision making with regard to incoming calls may reduce the number of unwanted calls that are accepted by a called party device, which may reduce network resources that might otherwise be consumed handling unwanted calls. Reducing the number of unwanted calls that are accepted by a called party device may also conserve resources on the calling party device and/or the called party device by not connecting a call that the called party is not interested in receiving.

As indicated above, FIG. 1 is provided merely as an example. Other examples are possible and may differ from what was described with regard to FIG. 1.

Figure 2:
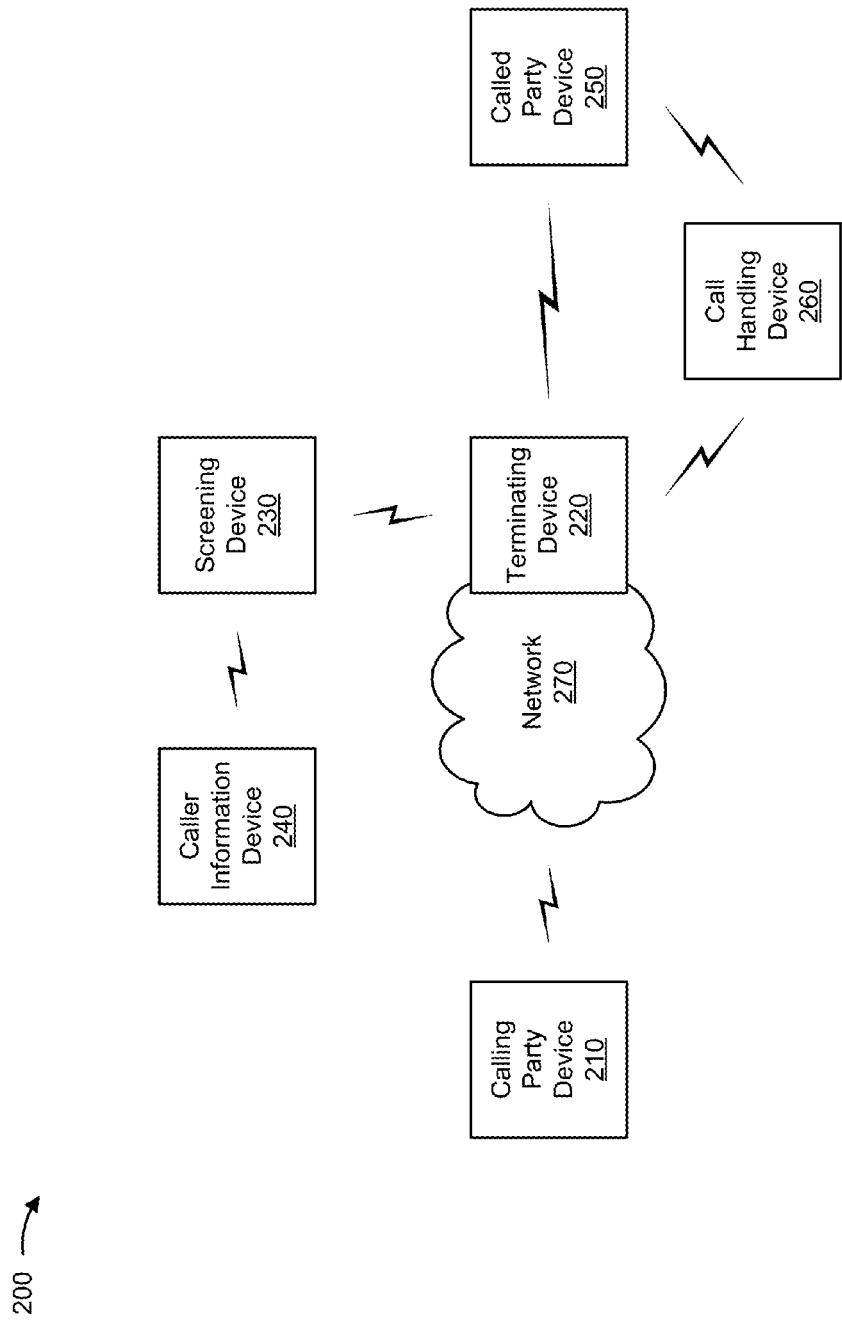
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a calling party device 210, a terminating device 220, a screening device 230, a caller information device 240, a called party device 250, a call handling device 260, and a network 270. Devices of environment 200 may interconnect via wired connections, wireless connections, or a combination of wired and wireless connections.

Calling party device 210 includes a device that is capable of communicating with one or more other devices included in environment 200. For example, calling party device 210 may include a wired communication device, a plain old telephone service (POTS) telephone, a voice over Internet protocol (VoIP) telephone, a wireless communication device, a radiotelephone, a personal communications system ("PCS") terminal (e.g., that may combine a cellular radiotelephone with data processing and data communications capabilities), a smart phone, a desktop computer, a laptop computer, a tablet computer, a personal gaming system, and/or a similar device. In some implementations, calling party device 210 may be capable of receiving and/or providing information associated with an Internet protocol (IP) Multimedia Subsystem (IMS) service.

In some implementations, calling party device 210 may include a device capable of initiating and participating in a call (e.g., a voice call or a video call) with called party device 250 via network 270 and terminating device 220. In some implementations, calling party device 210 may store and/or transmit identification information associated with calling party device 210.

Terminating device 220 includes one or more devices capable of receiving, generating, processing, storing, and/or providing information (e.g., communication traffic, identification information associated with the calling party device, information associated with a connection request, or the like) associated with calling party device 210 and/or called party device 250. For example, terminating device 220 may include a traffic transfer device, such as a server, a gateway, a router, a modem, a switch, a firewall, a network interface card ("NIC"), a hub, a bridge, an optical add/drop multiplexer ("OADM"), an end office switch, a softswitch, an IMS core device, or the like. In some implementations, terminating device 220 may assist in establishing a connection between calling party device 210 and called party device 250 (e.g., terminating device 220 may include a terminating switch, an end office switch, a softswitch, a signaling system 7 ("SS7") class 4 switch, an SS7 class 5 switch, or the like). In some implementations, one or more terminating devices 220 may be included in or associated with network 270.

In some implementations, terminating device 220 may transmit identification information (e.g., caller information) using a particular protocol (e.g., SS7, SS7 utilizing an Advanced Intelligent Network (AIN), session initiation protocol (SIP), or the like). In some implementations, terminating device 220 may send and/or receive, to and/or from calling party device 210 and/or called party device 250, identification information (e.g., caller information) while a request to establish a connection passes through network 270. In some implementations, terminating device 220 may generate and send (e.g., to screening device 230) identification queries and/or receive (e.g., from screening device 230) responses to identification queries. In some implementations, terminating device 220 may send caller information (e.g., received from screening device 230) to called party device 250 and/or to call handling device 260.

Screening device 230 includes one or more devices capable of receiving, processing, and responding to identification queries (e.g., from terminating device 220) based on calling party device information associated with calling party device 210. For example, screening device 230 may generate and send (e.g., to caller information device 240) caller information queries and/or receive (e.g., from caller information device 240) responses to caller information queries. In some implementations, screening device 230 may analyze and/or modify caller information (e.g., caller information received from caller information device 240) and send caller information and/or modified caller information to terminating device 220. In some implementations, such as where terminating device 220 has sufficient processing power and resources, screening device 230 may be implemented as a component or function of terminating device 220. In some implementations, screening device 230 may include one or more devices that are separate from terminating device 220.

Caller information device 240 includes one or more devices or systems capable of receiving, generating, processing, storing, and/or providing caller information to screening device 230 and/or terminating device 220. For example, caller information device 240 may include a server device, such as a line information database (LIDB) device, a home subscriber server (HSS), or the like, capable of storing and/or providing caller information (e.g., caller name information, caller number information, caller location information, or the like) associated with communication devices (e.g., calling party device 210). In some implementations, caller information device 240 may be associated with network 270, screening device 230, and/or terminating device 220.

Called party device 250 includes a device that is capable of communicating with one or more other devices included in environment 200. For example, called party device 250 may include a wired communication device, a POTS telephone, a VoIP telephone, a wireless communication device, a radiotelephone, a PCS terminal, a smart phone, a desktop computer, a laptop computer, a tablet computer, a personal gaming system, and/or a similar device. In some implementations, called party device 250 may be capable of receiving and/or providing information associated with an IMS service.

In some implementations, called party device 250 may include a device capable of initiating and participating in a call (e.g., a voice call or a video call) with calling party device 210 via terminating device 220 and network 270. In some implementations, called party device 250 may receive and/or display caller information (e.g., identification information associated with calling party device 210) that is included in a request for called party device 250 to establish a connection with calling party device 210.

Call handling device 260 includes one or more devices capable of receiving and processing requests to establish a connection with (e.g., calls to) called party device 250. For example, call handling device 260 may be associated with a service, acting on behalf of a user of called party device 250, to handle (e.g., block or allow through) incoming calls to called party device 250. In some implementations, call handling device 260 may determine how to handle an incoming call based on caller information and/or modified caller information received from terminating device 220. In some implementations, call handling device 260 may be implemented as a component or function of terminating device 220. In some implementations, call handling device 260 may be implemented as a component or function of called party device 250. In some implementations, call handling device 260 may include one or more devices that are separate from terminating device 220 and called party device 250.

Network 270 includes one or more wired and/or wireless networks. For example, network 270 may include a cellular network (e.g., a long-term evolution (LTE) network, a 3G network, a code division multiple access (CDMA) network, or the like), a public land mobile network (PLMN), a local area network (LAN), a wireless LAN (e.g., a Wi-Fi network), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network 270 may include one or more terminating devices 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
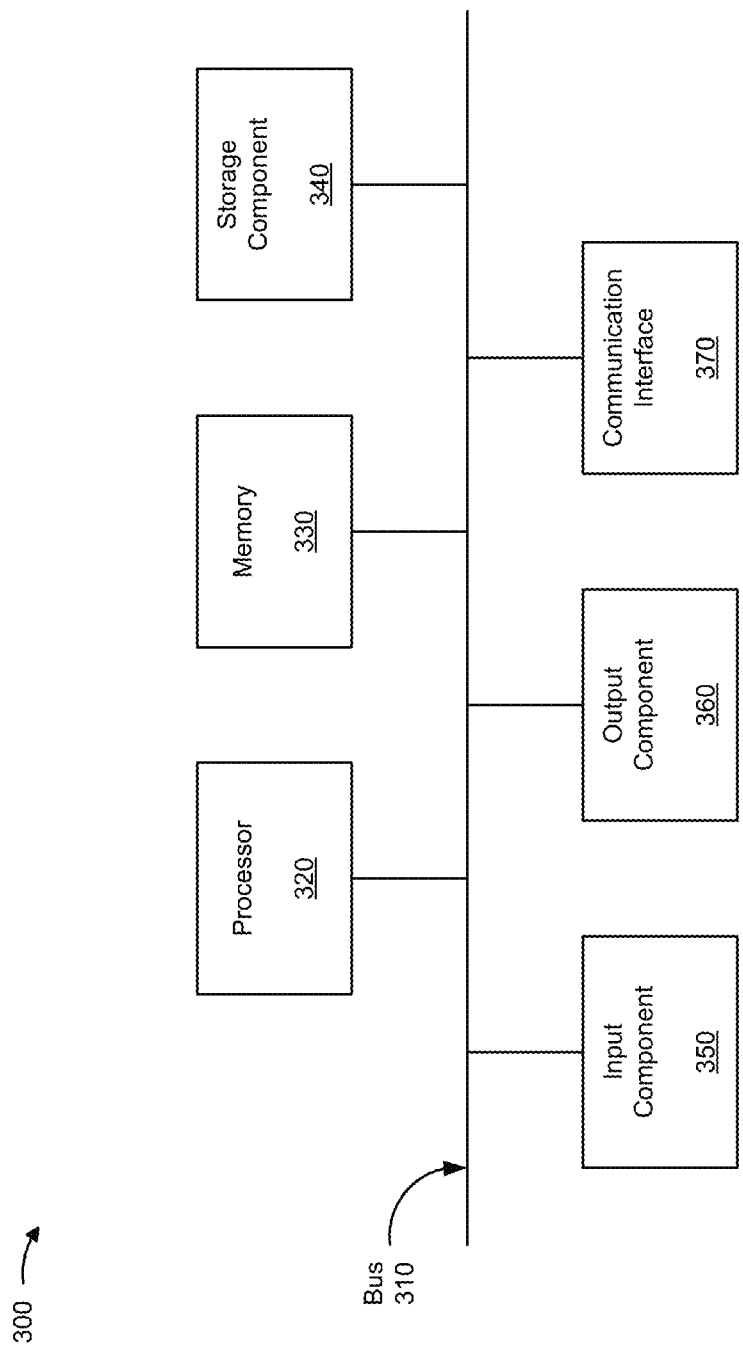
FIG. 3 is a diagram of example components of one or more devices of FIG. 2.

FIG. 3 is a diagram of example components of a device 300. Device 300 may correspond to calling party device 210, terminating device 220, screening device 230, caller information device 240, called party device 250, and/or call handling device 260. In some implementations, calling party device 210, terminating device 220, screening device 230, caller information device 240, called party device 250, and/or call handling device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), an accelerated processing unit (APU), etc.), a microprocessor, a microcontroller, and/or any processing component (e.g., a field-programmable gate array (FPGA) or an application-specific integrated circuit (ASIC)) that interprets and/or executes instructions. In some implementations, processor 320 may include one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, or a microphone). Additionally, or alternatively, input component 350 may include a sensor for sensing information (e.g., a global positioning system (GPS) component, an accelerometer, a gyroscope, or an actuator). Output component 360 includes a component that provides output information from device 300 (e.g., a display, a speaker, or one or more light-emitting diodes (LEDs)).

Communication interface 370 includes a transceiver-like component (e.g., a transceiver or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
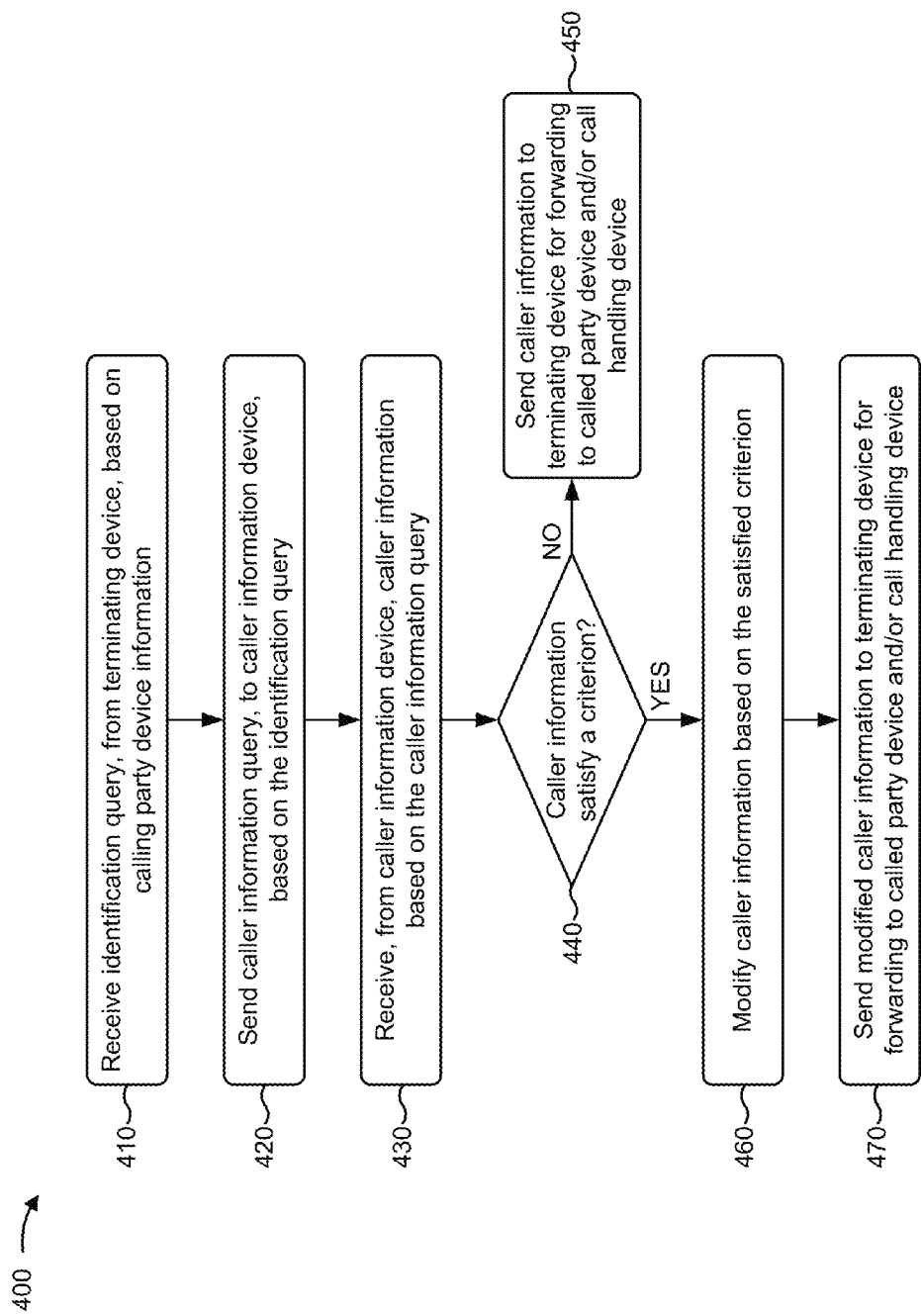
FIG. 4 is a flow chart of an example process for adding additional information to caller information.

FIG. 4 is a flow chart of an example process 400 for adding additional information to caller information. In some implementations, one or more process blocks of FIG. 4 may be performed by screening device 230. In some implementations, one or more process blocks of FIG. 4 may be performed by another device or a group of devices separate from or including screening device 230, such as calling party device 210, terminating device 220, caller information device 240, called party device 250, and/or call handling device 260.

As shown in FIG. 4, process 400 may include receiving an identification query, from a terminating device, based on calling party device information (block 410). For example, screening device 230 may receive, from terminating device 220, an identification query with regard to calling party device 210.

In some implementations, terminating device 220 may have received, from calling party device 210 and via network 270, a request to establish a connection with called party device 250. When terminating device 220 receives the request to establish a connection with called party device 250, terminating device 220 may generate and send, to screening device 230, an identification query.

In some implementations, terminating device 220 may determine whether to generate and send an identification query based on an identity of the called party device for which a connection is requested. In some implementations, terminating device 220 may generate and send an identification query when a connection is requested to any called party device that is serviced by terminating device 220.

The identification query may be based on calling party device information associated with calling party device 210. The calling party device information may include a caller number (e.g., a phone number) or other identification information (e.g., information present in network data or signaling) associated with calling party device 210. If calling party device 210 is a mobile device, the calling party device information may include a mobile device number (MDN), an international mobile subscriber identity (IMSI), a temporary mobile subscriber identity (TMSI), or the like. In some implementations, the identification query may include the calling party device information.

In some implementations, screening device 230 may receive the calling party device information from calling party device 210. For example, the request to establish a connection with called party device 250 may include the calling party device information.

As further shown in FIG. 4, process 400 may include sending a caller information query, to a caller information device, based on the identification query (block 420). For example, screening device 230 may send a caller information query to caller information device 240.

The caller information query may be based on the identification query. For example, upon receiving the identification query from terminating device 220, screening device 230 may generate and send, to caller information device 240, a caller information query based on the calling party device information. In some implementations, the caller information query may include the calling party device information (e.g., a caller number or other identification information associated with calling party device 210).

As further shown in FIG. 4, process 400 may include receiving, from the caller information device, caller information based on the caller information query (block 430). For example, screening device 230 may receive caller information from caller information device 240. Caller information may include identification information associated with calling party device 210, such as a caller number, a caller name, a caller location, or the like.

The caller information may be based on the caller information query that screening device 230 sent to caller information device 240. For example, upon receiving the caller information query from screening device 230, caller information device 240 (e.g., a LIDB) may identify caller information (e.g., a caller name) that corresponds to the calling party device information (e.g., a caller number) included in the caller information query.

In some implementations, caller information device 240 may send, to screening device 230, additional information that corresponds to the caller information and/or the calling party device information. For example, caller information device 240 may additionally send a presentation indicator based on the caller information and/or the calling party device information. In some implementations, the presentation indicator may specify whether presentation (e.g., display) of the caller information (e.g., a caller name or a caller number) and/or the calling party device information (e.g., a caller number) is allowed or disallowed.

As further shown in FIG. 4, process 400 may include determining whether the caller information satisfies a criterion (block 440). For example, screening device 230 may determine whether the caller information satisfies a criterion or a set of criteria, which may include objective and subjective criteria. As used herein, satisfying a criterion may refer to matching one or more items of information, matching multiple items of information, matching a combination of items of information, exhibiting one or more patterns and/or characteristics, satisfying a threshold, or the like.

In some implementations, criteria may be defined by a system operator (e.g., an operator of terminating device 220, screening device 230, caller information device 240, called party device 250, and/or network 270). In some implementations, criteria may be defined by a user of called party device 250 and/or an operator of call handling device 260.

In some implementations, the criteria may include a time of day, a time range, a ranking assigned to caller information (e.g., a trust ranking, a suspicion ranking, an importance ranking), whether the caller information is associated with any reporting to, or action taken by, a governmental body (e.g., the Federal Communications Commission (FCC) in the U.S.), whether the caller information includes predetermined words, or the like.

In some implementations, the criteria may include a pattern of calls associated with a caller number and/or a caller name. For example, the criteria may include a behavioral pattern (e.g., calls, from a caller number or a caller name, to multiple different called party devices based on sequential phone numbers) or a volumetric pattern (e.g., calls, from a caller number or a caller name, to more than a threshold number of called party devices within a predetermined time period).

In some implementations, caller information that satisfies a criterion may indicate that a request to establish a connection with called party device 250 should be rejected. For example, the criterion may be indicative of a request to establish an unwanted (e.g., by a user of called party device 250) connection.

In some implementations, caller information that satisfies a criterion may indicate that a request to establish a connection with called party device 250 should be accepted. For example, the criterion may be indicative of a request to establish an expected (e.g., by a user of called party device 250) or important connection.

In some implementations, the caller information may satisfy a criterion when the caller information matches information in one or more lists (e.g., lists of caller names and/or caller numbers). For example, the caller information may satisfy a criterion when the caller information (e.g., caller name or caller number) matches information in a white list (e.g., a list of trusted caller numbers or caller names), a black list (e.g., a list of caller numbers or caller names to be blocked), a gray list, or another purpose-driven list. Such lists may be provided by a user of called party device 250, third parties, trusted sources, or authoritative sources.

In some implementations, the criteria may include objective criteria and/or industry lists, which may be used to identify caller information that may be associated with robocalling activities (e.g., phone calls made using a computerized autodialer to deliver pre-recorded messages).

As further shown in FIG. 4, if the caller information does not satisfy a criterion (block 440—NO), process 400 may include sending caller information to the terminating device for forwarding to a called party device and/or a call handling device (block 450). For example, if screening device 230 determines that the caller information does not satisfy a criterion, screening device 230 may send the caller information (e.g., without modification) to terminating device 220. In some implementations, terminating device 220 may forward the unmodified caller information to called party device 250 and/or to call handling device 260.

As further shown in FIG. 4, if the caller information satisfies a criterion (block 440—YES), process 400 may include modifying the caller information based on the satisfied criterion (block 460). For example, if screening device 230 determines that the caller information satisfies a criterion, screening device 230 may modify the caller information to provide additional information to indicate that the caller information satisfies the criterion. In some implementations, screening device 230 may modify the caller information, to provide the additional information, by adding characters to the caller information, changing characters in the caller information, deleting characters from the caller information, changing how the caller information will be displayed (e.g., changing a display color or causing the caller information to flash), adding a media file (e.g., an image file, an audio file, or a video file) to the caller information, or the like.

In some implementations, screening device 230 may modify or supplement the content of one or more fields (e.g., the caller name field or the caller number field) within the caller information to indicate that the caller information satisfies a criterion. For example, screening device 230 may add a character (e.g., an "*") or set of characters to one or more caller information fields (e.g., the caller name field or the caller number field). In some implementations, screening device 230 may insert a character or a set of characters at the start of one or more caller information fields (e.g., the caller name field or the caller number field) to indicate that the caller information satisfies a criterion.

When modifying the caller information, screening device 230 may do so based on the satisfied criterion. For example, screening device 230 may modify the caller information to indicate which criterion and/or type of criterion was satisfied by the caller information. In some implementations, screening device 230 may add particular characters or combinations of characters to indicate particular satisfied criteria. For example, screening device 230 may add the characters "WL-" to the start of the caller name field and/or the caller number field to indicate that the caller information matches caller information in a white list. Alternatively, screening device 230 may, for example, add the character "*" to the start of the caller name field and/or the caller number field to indicate that the caller information matched a pattern suggestive of an unwanted call (e.g., a robocall). In some implementations, screening device 230 may modify the caller information to specify whether the caller information (e.g., a caller name or a caller number) and/or the calling party device information (e.g., a caller number) has been verified (e.g., has not been spoofed).

In some implementations, screening device 230 may replace or fill one or more caller information fields with a substitute value, such as UNKNOWN or PRIVATE. For example, screening device 230 may not receive a caller name for calling party device 210, or a presentation indicator may indicate that display of the caller name and/or the caller number is disallowed. In some implementations, screening device 230 may modify or supplement the substitute value (e.g., by inserting a character or a set of characters at the start of the substitute value) to indicate that caller information associated with an incoming call satisfies a criterion even though the caller information might be unavailable for display.

As further shown in FIG. 4, process 400 may include sending the modified caller information to the terminating device for forwarding to the called party device and/or the call handling device (block 470). For example, screening device 230 may send the modified caller information to terminating device 220. In some implementations, terminating device 220 may forward the modified caller information to called party device 250 (e.g., for display to a user of called party device 250) and/or to call handling device 260. In some implementations, terminating device 220 may forward the modified caller information to a device, separate from called party device 250, for display to a user of called party device 250.

In some implementations, the modified caller information (e.g., when forwarded to called party device 250 and/or call handling device 260) may be used to support determining how to handle a request to establish the connection with (e.g., a call to) called party device 250. For example, a user of called party device 250 may use the additional information included in the modified caller information to determine whether to accept a request to establish a connection (e.g., a call). Alternatively, call handling device 260 may use the additional information included in the modified caller information to determine whether to block a request to establish a connection (e.g., a call), allow the request (e.g., the call) to be received by called party device 250, send the request (e.g., the call) to a voicemail system, generate an e-mail or text message based on the request, generate a log in a file, or the like.

In some implementations, the modified caller information may be used for automated call handling (e.g., by terminating device 220, called party device 250, and/or call handling device 260). For example, terminating device 220, called party device 250, and/or call handling device 260 may determine how to handle (e.g., allow or block) an incoming call based on identification of the characters added to one or more caller information fields of the modified caller information. In some implementations, customized handling of calls may be defined for various criteria considered by screening device 230 (e.g., as reflected by various characters or sets of characters that may be added to one or more caller information fields of the modified caller information).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may modify caller information (e.g., caller ID information) to add additional information to the caller information, which may enable a user of a called party device, or a service acting on behalf of the user, to make an informed decision about how to handle an incoming call (e.g., to answer, block, or ignore the call). Enabling informed decision making with regard to incoming calls may reduce the number of unwanted calls that are accepted by a called party device, which may reduce network resources that might otherwise be consumed handling unwanted calls. Reducing the number of unwanted calls that are accepted by a called party device may also conserve resources on the calling party device and/or the called party device by not connecting a call that the called party is not interested in receiving.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments modify caller information (e.g., caller ID information), it should be understood that such modification shall be in accordance with all applicable laws concerning caller information.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive, from a terminating device, a first query,
      the first query being based on the terminating device having received, from a calling party device, a request to establish a connection with a called party device, and
      the first query being based on information associated with the calling party device;
   send, to a caller information device, a second query based on the first query;
   receive, from the caller information device, caller information based on the second query;
   compare the caller information to a criterion to determine that the caller information satisfies the criterion;
   modify the caller information to create modified caller information,
      the caller information being modified based on the caller information satisfying the criterion; and
   send the modified caller information to the terminating device for forwarding to another device to support determining how to handle the request to establish the connection with the called party device.

2. The device of claim 1, where the criterion comprises a pattern.

3. The device of claim 1,
   where the caller information includes at least one of a caller name field or a caller number field; and
   where the one or more processors, when modifying the caller information to create the modified caller information, are to:
   modify the at least one of the caller name field or the caller number field.

4. The device of claim 1,
   where the caller information includes at least one field; and
   where the one or more processors, when modifying the caller information to create the modified caller information, are to:
   add at least one character to the at least one field.

5. The device of claim 1,
   where the caller information includes a calling party device caller number;
   where the criterion includes a list of caller numbers; and
   where the caller information satisfies the criterion when the calling party device caller number matches a caller number in the list of caller numbers.

6. The device of claim 1,
   where the criterion is associated with an unwanted connection of the called party device; and
   where the one or more processors, when modifying the caller information to create the modified caller information, are to:

add at least one character to the caller information,
the at least one character designating the request as being associated with the unwanted connection of the called party device.

7. The device of claim 1, where the other device is the called party device.

8. A non-transitory computer-readable medium storing instructions, the instructions comprising:
one or more instructions that, when executed by one or more processors, cause the one or more processors to:
receive, from a terminating device, a first query,
the first query being based on the terminating device having received, from a calling party device, a request to establish a connection with a called party device, and
the first query being based on information associated with the calling party device;
send, to a caller information device, a second query based on the first query;
receive, from the caller information device, caller information based on the second query;
compare the caller information to a criterion to determine whether the caller information satisfies the criterion;
modify the caller information, to create modified caller information, when the caller information satisfies the criterion; and
send the modified caller information to the terminating device for forwarding to another device to support determining how to handle, for the called party device, the request to establish the connection.

9. The non-transitory computer-readable medium of claim 8, where the one or more instructions, that cause the one or more processors to compare the caller information to the criterion to determine whether the caller information satisfies the criterion, cause the one or more processors to:
compare the caller information to a plurality of criteria to determine whether the caller information satisfies the plurality of criteria,
the plurality of criteria including the criterion.

10. The non-transitory computer-readable medium of claim 8,
where the caller information includes at least one of a caller name field or a caller number field; and
where the one or more instructions, that cause the one or more processors to modify the caller information to create the modified caller information, cause the one or more processors to:
modify the at least one of the caller name field or the caller number field.

11. The non-transitory computer-readable medium of claim 8,
where the caller information includes at least one field; and
where the one or more instructions, that cause the one or more processors to modify the caller information to create the modified caller information, cause the one or more processors to:
add at least one character to the at least one field.

12. The non-transitory computer-readable medium of claim 8,
where the caller information includes a calling party device caller number;
where the criterion includes a list of caller numbers; and
where the one or more instructions, that cause the one or more processors to compare the caller information to the criterion to determine whether the caller information satisfies the criterion, cause the one or more processors to:
compare the caller information to the criterion to determine that the calling party device caller number matches a caller number in the list of caller numbers.

13. The non-transitory computer-readable medium of claim 12, where the one or more instructions, when executed by the one or more processors, further cause the one or more processors to:
receive, from the called party device and before comparing the caller information to the criterion, the list of caller numbers.

14. The non-transitory computer-readable medium of claim 8, where the one or more instructions, that cause the one or more processors to modify the caller information to create the modified caller information, cause the one or more processors to:
add at least one character to the caller information,
the at least one character being indicative of whether to allow or block the request to establish the connection.

15. A method, comprising:
receiving, by a device and from a terminating device, a first query,
the first query being based on the terminating device having received, from a calling party device, a request to establish a connection with a called party device, and
the first query being based on information associated with the calling party device;
sending, by the device and to a caller information device, a second query based on the first query;
receiving, by the device and from the caller information device, caller information based on the second query;
comparing, by the device, the caller information to a criterion;
modifying, by the device, the caller information to create modified caller information when the caller information satisfies the criterion; and
sending, by the device, the modified caller information to the terminating device for forwarding to another device to support determining how to handle, for the called party device, the request to establish the connection.

16. The method of claim 15,
where the caller information includes at least one of a caller name field or a caller number field; and
where modifying the caller information to create the modified caller information comprises:
modifying the at least one of the caller name field or the caller number field.

17. The method of claim 15,
where the caller information includes at least one field; and
where modifying the caller information to create the modified caller information comprises:
adding at least one character to the at least one field.

18. The method of claim 15,
where the criterion includes at least one of a behavioral pattern or a volumetric pattern; and
where comparing the caller information to the criterion comprises:
comparing the caller information to the at least one of the behavioral pattern or the volumetric pattern to determine whether the caller information exhibits the at least one of the behavioral pattern or the volumetric pattern.

19. The method of claim 15, where modifying the caller information to create the modified caller information comprises:

modifying the caller information based on the criterion.

20. The method of claim 15, where modifying the caller information to create the modified caller information comprises:

adding at least one character to the caller information,
the at least one character being indicative of whether to block the request to establish the connection.

\* \* \* \* \*